United States Patent
Nakata et al.

(10) Patent No.: US 9,669,717 B2
(45) Date of Patent: Jun. 6, 2017

(54) VEHICLE

(71) Applicant: TOYOTA JIDOSHA KABUSHIKI KAISHA, Toyota-shi, Aichi-ken (JP)

(72) Inventors: Daisuke Nakata, Seto (JP); Tetsuya Miyazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/913,868

(22) PCT Filed: Aug. 22, 2014

(86) PCT No.: PCT/IB2014/001590
§ 371 (c)(1),
(2) Date: Feb. 23, 2016

(87) PCT Pub. No.: WO2015/028861
PCT Pub. Date: Mar. 5, 2015

(65) Prior Publication Data
US 2016/0200200 A1 Jul. 14, 2016

(30) Foreign Application Priority Data

Aug. 26, 2013 (JP) ................................. 2013-174223

(51) Int. Cl.
*B60L 7/18* (2006.01)
*B60L 7/26* (2006.01)
(Continued)

(52) U.S. Cl.
CPC ........ *B60L 7/26* (2013.01); *B60K 6/26* (2013.01); *B60K 6/445* (2013.01); *B60T 13/586* (2013.01);
(Continued)

(58) Field of Classification Search
CPC . B60T 1/10; B60T 8/17; B60T 13/586; B60K 31/00; B60K 6/02; B60K 6/04; B60K 6/26; B60L 7/26; B60L 7/24
(Continued)

(56) References Cited

U.S. PATENT DOCUMENTS 5,511,866 A * 4/1996 Terada .................... B60L 3/108
303/15
6,719,076 B1 * 4/2004 Tabata .................... B60K 31/00
180/65.7
(Continued)

FOREIGN PATENT DOCUMENTS

JP 2005-199748 A 7/2005
JP 2009-056920 A 3/2009
(Continued)

*Primary Examiner* — Christopher Schwartz
(74) *Attorney, Agent, or Firm* — Oliff PLC

(57) ABSTRACT

A vehicle includes: a friction braking device configured to generate a friction braking force; a generator motor configured to generate a regenerative braking force; and a control unit configured to adjust the friction braking force and adjust the regenerative braking force by controlling energization of the generator motor such that a required braking force that is required by the vehicle is generated, interrupt energization of the generator motor at predetermined timing after timing at which a specific operation, which is a combination of a plurality of operations conducted by an occupant, has completed within a threshold time, and control the generator motor so as to prohibit generation of the regenerative braking force by the generator motor when at least one of the plurality of operations combined as the specific operation has been detected within a specific period back from braking start timing at which the required braking force is generated.

6 Claims, 7 Drawing Sheets

(51) Int. Cl.
*B60W 30/18* (2012.01)
*B60K 6/26* (2007.10)
*B60T 13/58* (2006.01)
*B60W 10/08* (2006.01)
*B60W 10/188* (2012.01)
*B60K 6/445* (2007.10)
*B60W 50/08* (2012.01)
*B60W 20/00* (2016.01)
*B60W 10/184* (2012.01)

(52) U.S. Cl.
CPC .......... *B60W 10/08* (2013.01); *B60W 10/184* (2013.01); *B60W 10/188* (2013.01); *B60W 20/00* (2013.01); *B60W 30/18109* (2013.01); *B60W 30/18127* (2013.01); *B60W 50/082* (2013.01); *B60W 2540/06* (2013.01); *B60Y 2200/92* (2013.01); *B60Y 2300/89* (2013.01); *B60Y 2300/91* (2013.01); *B60Y 2400/81* (2013.01); *Y02T 10/6239* (2013.01); *Y10S 903/904* (2013.01); *Y10S 903/906* (2013.01)

(58) Field of Classification Search
USPC ...................... 303/3, 15, 152; 180/65.1–65.7
See application file for complete search history.

(56) References Cited

U.S. PATENT DOCUMENTS

| | | | |
|---|---|---|---|
| 2009/0062991 | A1 | 3/2009 | Hayashikawa et al. |
| 2011/0285198 | A1* | 11/2011 | Nakata ................... B60K 6/445 303/3 |
| 2016/0200199 | A1* | 7/2016 | Nakata ..................... B60T 1/10 303/3 |

FOREIGN PATENT DOCUMENTS

| | | |
|---|---|---|
| JP | 2011-056969 A | 3/2011 |
| JP | 2015-042506 A | 3/2015 |
| WO | 2015/028858 A1 | 3/2015 |

* cited by examiner

VEHICLE

BACKGROUND OF THE INVENTION

1. Field of the Invention

The invention relates to a vehicle. More specifically, the invention relates to a vehicle including a friction braking device, a generator motor and a control unit that controls the friction braking device and the generator motor.

2. Description of Related Art

For example, there is known a brake control system described in Japanese Patent Application Publication No. 2011-56969 (JP 2011-56969 A). The brake control system includes regenerative braking means for applying a regenerative braking force to heels by an electric motor and hydraulic braking means for applying a hydraulic braking force to the wheels by pressing friction members against the wheels by the use of hydraulic pressure. In the brake control system, control means determines a target regenerative braking force and a target hydraulic braking force on the basis of a limit value set for the regenerative braking force and a target total braking force, and executes cooperative control over the regenerative braking means and the hydraulic braking means in accordance with these determined target regenerative braking force and target hydraulic braking force. In the thus configured brake control system, when the regenerative braking force is limited by the limit value, the hydraulic braking force is immediately increased in order to achieve the target total braking force.

SUMMARY OF THE INVENTION

Incidentally, in a vehicle including the hydraulic braking means (friction braking device), the electric motor (generator motor) and the control means (control unit) that controls the hydraulic braking means (friction braking device and the electric motor (generator motor), which constitute the above-described brake control system, that is, for example, a hybrid vehicle, there may occur a situation that a main switch (or an ignition switch) is changed from an on state to an off state while the vehicle is traveling.

Specifically, a driver (occupant), for example, presses an operation button of a main switch a preset number of times within a preset time in a vehicle in traveling. Thus, the driver (occupant) is allowed to change the main switch from the on state to the off state. In this case, in the above-described related art, the control means of the brake control system preferentially stops the operation of the electric motor by interrupting energization of the electric motor. Therefore, when the number of pressing operations of the operation button becomes the preset number of times while the vehicle is being braked, energization of the electric motor is interrupted. Thus, in the above-described related art, in the vehicle that is being braked by the brake control system, the deceleration fluctuates as a result of a rapid reduction in the regenerative braking force that is generated by the electric motor, so the driver (occupant) may experience a feeling of strangeness.

The invention provides a vehicle that suppresses fluctuations in the deceleration during braking.

An aspect of the invention provides a vehicle. The vehicle includes: a friction braking device configured to generate a friction braking force; a generator motor configured to generate a regenerative braking force; and a control unit configured to adjust the friction braking force and adjust the regenerative braking force by controlling energization of the generator motor such that a required braking force that is required by the vehicle is generated, interrupt energization of the generator motor at predetermined timing after timing at which a specific operation, which is a combination of a plurality of operations conducted by an occupant, has completed within a threshold time, and control the generator motor so as to prohibit generation of the regenerative braking force by the generator motor when at least one of the plurality of operations combined as the specific operation has been detected within a specific period back from braking start timing at which the required braking force is generated.

In the above aspect, the specific period may be a period back from the braking start timing by a time shorter than or equal to the threshold time.

According to the above aspect, when the control unit has detected the at least one of the plurality of operations combined as the specific operation within the specific period back from the braking start timing by a time shorter than or equal to the threshold time, in other words, at the time when the vehicle is traveling without being braked, the control unit is able to prohibit the regenerative braking force by the generator motor. That is, when the at least one of the plurality of operations combined as the specific operation has been detected within the specific period, after that, more specifically, there is a significantly high possibility that the specific operation completes while the vehicle is being braked, and energization of the generator motor is interrupted at the predetermined timing when the specific operation completes.

Therefore, the control unit prohibits generation of the regenerative braking force that rapidly reduces as a result of interruption of energization of the generator motor previously (in advance) in such a situation that there is a high possibility that the specific operation completes. Thus, the control unit is able to achieve the required braking force by the use of the friction braking force in a situation that there is a high possibility that the specific operation completes. Thus, it is possible not to cause the braking force to fluctuate even when energization of the generator motor is interrupted at the predetermined timing. As a result, it is possible to reliably suppress fluctuations in the deceleration of the vehicle, resulting from a rapid reduction in the regenerative braking force, so it is possible to prevent the occupant from experiencing a feeling of strangeness.

In the above aspect, the control unit may be configured to detect the at least one of the plurality of operations combined as the specific operation after a travel starting operation to start causing the vehicle to travel. With this configuration, when the travel starting operation is the same as the at least one of the plurality of operations combined as the specific operation, the control unit is able to distinguish and exclude the travel starting operation even when the travel starting operation is conducted within the specific period, and is able to appropriately detect the at least one of the plurality of operations combined as the specific operation intended by the occupant.

Thus, at the time of braking the vehicle immediately after the start of traveling, even when the travel starting operation is conducted within the specific period, the control unit does not detect the travel starting operation as the at least one of the plurality of operations. As a result, it is possible to increase an opportunity to achieve the required braking force by the use of both the regenerative braking force and the friction braking force. Thus, it is possible to actively recover regenerative electric power resulting from generation of the regenerative braking force, so it is possible to suppress deterioration of the fuel consumption rate (fuel economy) of the vehicle by, for example, consuming the recovered regenerative electric power.

In the above aspect, the control unit may be configured to detect the at least one of the plurality of operations combined as the specific operation after a vehicle speed of the vehicle becomes higher than zero. With this configuration, the control unit is able to exclude the occupant's (driver's) operation to cause the vehicle to start traveling (including the above-described travel starting operation) after the vehicle speed becomes higher than zero, that is, by determining that the vehicle has already started traveling. Therefore, even when the operation to cause the vehicle to start traveling (including the above-described travel starting operations is the same as the at least one of the plurality of operations combined as the specific operation, it is possible to appropriately detect the at least one of the plurality of operations combined as the specific operation intended by the occupant.

Thus, in this case as well, it is possible to increase an opportunity to achieve the required braking force by the use of both the regenerative braking force and the friction braking force, so it is possible to actively recover regenerative electric power resulting from generation of the regenerative braking force. Thus, it is possible to suppress deterioration of fuel economy of the vehicle by consuming the recovered regenerative electric power. By determining whether the vehicle speed is higher than zero, for example, even in a vehicle that is not able to distinguish the above-described travel starting operation by detecting the travel starting operation or a vehicle that is not able to detect and distinguish the above-described travel starting operation because of a failure, it is possible to detect the at least one of the plurality of operations combined as the specific operation intended by the occupant.

In the above aspect, the control unit may be configured to prohibit generation of the regenerative braking force by the generator motor until a lapse of a predetermined time from operation detection timing at which the at least one of the plurality of operations combined as the specific operation has been detected. As described above, when the at least one of the plurality of operation combined as the specific operation has been detected within the specific period, there is a high possibility that the specific operation completes during braking thereafter. When the specific operation has completed, energization of the generator motor is interrupted at the predetermined timing as described above, and the regenerative braking force is not generated. Thus, when the control unit has detected the at least one of the plurality of operations combined as the specific operation within the specific period, the control unit prohibits generation of the regenerative braking force, and achieves the required braking force by the use of the friction braking force. Thus, the control unit does not cause the deceleration of the vehicle to fluctuate, and prevents the occupant from experiencing a feeling of strangeness.

On the other hand, even when the at least one of the plurality of operations combined as the specific operation has been detected within the specific period, there is also a possibility that no operation is conducted by the occupant thereafter and the specific operation does not complete. In this case, it is possible to generate the regenerative braking force by the generator motor without interrupting energization of the generator motor at the predetermined timing. The control unit prohibits generation of the regenerative braking force until a lapse of the predetermined time from the operation detection timing (specifically, a time longer than a time from the operation detection timing to the predetermined timing), and allows generation of the regenerative braking force by the generator motor after the lapse of the predetermined time.

Thus, in the case where the specific operation has completed, after a lapse of the predetermined time from the operation detection timing, the control unit is able to achieve the required braking force by the use of the friction braking force as described above. On the other hand, in the case where the specific operation has not completed, after a lapse of the predetermined time from the operation detection timing, the control unit is able to generate the regenerative braking force by the generator motor, and is able to achieve the required braking force by the use of both the regenerative braking force and the friction braking force. Thus, in the case where the specific operation has not completed, it is possible to actively recover regenerative electric power resulting from generation of the regenerative braking force, and, for example, it is possible to suppress deterioration of the fuel consumption rate (fuel economy) of the vehicle by consuming the recovered regenerative electric power.

In the above aspect, the specific operation may be a combination of multiple pressing operations of a switch that is used at the time of changing from an energized state where an electrical device mounted on the vehicle is energized to a non-energized state where energization of the electrical device is interrupted, and the control unit may be configured to interrupt energization of the generator motor by interrupting at least an energization path to the generator motor at the predetermined timing.

With this configuration, because the specific operation completes in the case where the switch has been pressed by the occupant multiple times within the threshold time, the control unit is able to interrupt energization of the generator motor by interrupting at least the energization path to the generator motor at the predetermined timing. Therefore, when the control unit has detected at least one pressing operation of the switch within the specific period, there is a high possibility that the specific operation completes and energization of the generator motor is interrupted while the vehicle is being braked, so it is possible to prohibit generation of the regenerative braking force previously (in advance).

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
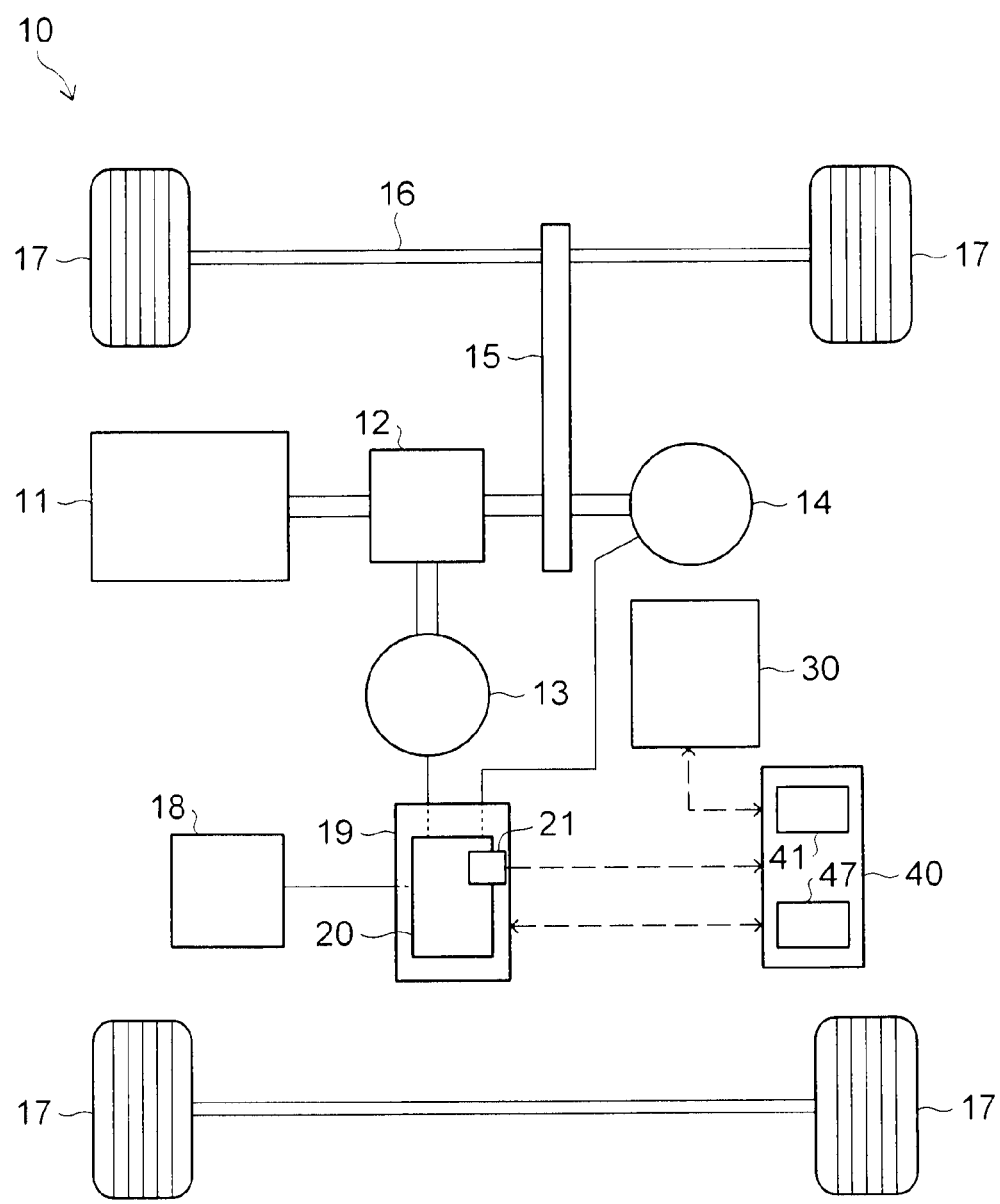
FIG. 1 is a system diagram that shows the schematic configuration of a hybrid vehicle according to an embodiment of the invention.

Hereinafter, a vehicle according to an embodiment of the invention will be described with reference to the accompanying drawings. FIG. 1 is a system diagram that illustrates the schematic configuration of a hybrid vehicle 10, which is the vehicle according to the present embodiment and includes a motor generator and an engine as drive sources. In this hybrid vehicle 10, both a regenerative braking force that is generated by converting kinetic energy to electric energy and a friction braking force that is generated by converting kinetic energy to thermal energy are allowed to be used for braking. Thus, the hybrid vehicle 10 according to the present embodiment is able to execute regenerative brake cooperative control in which a required braking force is generated by the use (cooperation) of these regenerative braking force and friction braking force.

The hybrid vehicle 10 includes not only a hybrid vehicle (HV) including a motor generator and an engine but also a plug-in hybrid vehicle (PHV) that is rechargeable with the use of an external power supply. In the present embodiment, the hybrid vehicle 10 will be described as an example. Of course, the invention may also be implemented by employing an electric vehicle (EV) on which no engine is mounted.

As shown in FIG. 1, the hybrid vehicle 10 includes an engine 11, a power split mechanism 12, motor generators 13, 14, a transmission gear 15, a drive shaft 16 and wheels 17. The motor generators 13, 14 each serve as a generator motor. The hybrid vehicle 10 further includes an electrical storage device 18 and a power converter 19.

The engine 11 outputs a driving force by consuming hydrocarbon fuel (specifically, gasoline, light oil, ethanol, or the like) stored in a fuel tank (not shown) through combustion. In the hybrid vehicle 10, a driving force (kinetic energy) that is output from the engine 11 drives the transmission gear 15 that transmits a driving force to the drive shaft 16 (wheels 17) via the power split mechanism 12.

The power split mechanism 12 is coupled to the engine 11, the motor generator 13 (14) and the transmission gear 15, and distributes power among these elements. A planetary gear unit having three rotary shafts of, for example, a sun gear, a planetary carrier and a ring gear, may be employed as the power split mechanism 12. These rotary shafts are respectively connected to the rotary shafts of the engine 11, motor generator 13 (14) and transmission gear 15.

Each of the motor generators 13, 14 is a three-phase synchronous generator motor that functions as an electric motor when an electric power (electric energy) is supplied from the electrical storage device 18 and that functions as a generator when a driving force is transmitted from the engine 11 or a rotational force (kinetic energy) is transmitted from the wheels 17. Specifically, the motor generator 13 functions as a generator when the driving force (kinetic energy) of the engine 1, split by the power split mechanism 12, is transmitted, and also functions as a motor that can start the engine 11. The motor generator 14 functions as an electric motor (power source) that drives the transmission gear 15 transmitting a driving force to the drive shaft 16 (wheels 17), and also functions to generate a regenerative braking force by converting rotation of the wheels 17, that is, the kinetic energy of the vehicle, to an electric power (electric energy) through regenerative control during braking of the vehicle (described later).

In the present embodiment, the motor generator 13 functions as a generator, and the motor generator 14 functions as an electric motor. Of course, the invention may be implemented such that the motor generator 14 functions as a generator and the motor generator 13 functions as an electric motor, or the invention may be implemented such that the motor generators 13, 14 both function as generators or electric motors.

The electrical storage device 18 is a rechargeable direct-current power supply, and is, for example, formed of a secondary battery, such as a nickel-metal hydride secondary battery and a lithium ion secondary battery. The electrical storage device 18 supplies an electric power to the power converter 19 when the motor generator 14 generates a predetermined driving force. The electrical storage device 18 receives an electric power that is generated by the motor generator 13 and a regenerated electric power resulting from the regenerative braking force generated by the motor generator 14, from the power converter 19 and then stores the electric power. A large-capacitance capacitor may also be employed as the electrical storage device 18. The electrical storage device 18 may be any electric power buffer, that is, a power supply, as long as the electric power buffer is able to temporarily store an electric power generated by the motor generator 13 or the motor generator 14 or an electric power from an eternal power supply and supply the stored electric power to the motor generator 13 or the motor generator 14.

Figure 2:
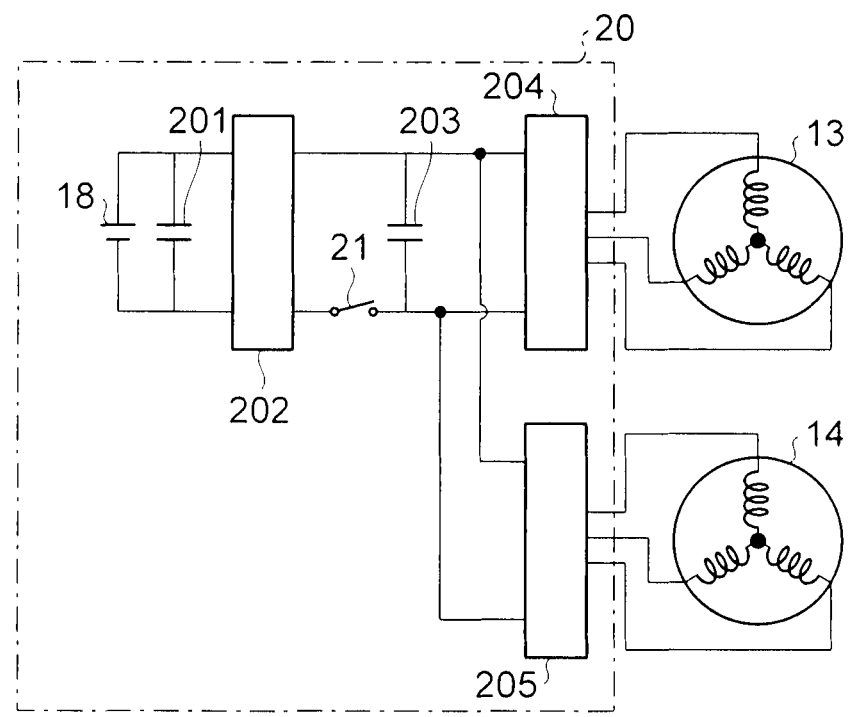
FIG. 2 is a schematic circuit diagram that illustrates a power supply circuit shown in FIG. 1.

The power converter 19 at least constitutes an energization path to the motor generator 14 that is a generator motor, and is configured to include a known power supply circuit 20 as shown in FIG. 1. As shown in FIG. 2, the power supply circuit 20 includes a smoothing capacitor 201 on the electrical storage device 18 side, a voltage converter 202, a step-up-side smoothing capacitor 203, and inverter circuits 204, 205. A main switch 21 is provided in the power supply circuit 20. The main switch 21, for example, serves as a switch that is operated by an occupant, including a driver, in a vehicle cabin and used to change from an energized state to a non-energized state. In the energized state, an electric power is supplied from the electrical storage device 18 to an electrical device. In the non-energized state, supply of an electric power is interrupted. For example, an ignition switch that mainly activates an ignition device of the engine 11 may be employed as the switch.

As shown in FIG. 1, a friction brake device 30 that serves as a friction braking device is mounted on the hybrid vehicle 10. As is specifically shown in FIG. 3, the friction brake device 30 is configured to include a brake operation unit 31, a master cylinder unit 32, a power hydraulic pressure generating unit 33, a brake unit 34 and a hydraulic control valve unit 35. The brake operation unit 31 is formed of a brake pedal 311, a master line 312, a regulator line 313, an accumulator line 314 and a reservoir line 315. The brake pedal 311 is depressed by the driver, which is a brake operation. The master line 312, the regulator line 313, the accumulator line 314 and the reservoir line 315 flow working fluid among the units as will be described later.

The master cylinder unit 32 includes a hydraulic booster 321, a master cylinder 322, a regulator 323, and a reservoir 324. The hydraulic booster 321 is coupled to the brake pedal 311, amplifies a pedal depression force applied to the brake pedal 311, and transmits the amplified pedal depression force to the master cylinder 322. The hydraulic booster 321 is supplied with working fluid from the power hydraulic pressure generating unit 33 via the regulator 323, amplifies a pedal depression force, and transmits the amplified pedal depression force to the master cylinder 322. The master cylinder 322 generates a master cylinder pressure having a predetermined boosting ratio with respect to a pedal depression force.

The reservoir 324 that stores working fluid is provided on the upper side of the master cylinder 322 and the regulator 323. The master cylinder 322 communicates with the reservoir 324 when depression of the brake pedal 311 is released. The regulator 323 communicates with both the reservoir 324 and an accumulator 332 (described later) of the power hydraulic pressure generating unit 33, and generates a hydraulic pressure substantially equal to the master cylinder pressure by using the reservoir 324 as a low-pressure source and using the accumulator 332 as a high-pressure source. In the following description, the hydraulic pressure of the regulator 323 is referred to as regulator pressure. The master cylinder pressure and the regulator pressure do not need to be strictly the same. For example, the regulator pressure may be set so as to be slightly higher than the master cylinder pressure.

The power hydraulic pressure generating unit 33 includes a pump 331 and the accumulator 332. An intake port of the pump 331 is connected to the reservoir 324, a discharge port of the pump 331 is connected to the accumulator 332, and working fluid is pressurized by driving a motor 333. The accumulator 332 converts pressure energy of working fluid pressurized by the pump 331 to pressure energy of encapsulated gas, such as nitrogen, and accumulates the pressure energy. The accumulator 332 is connected to a relief valve 325 provided in the master cylinder unit 32. The relief valve 325 opens when the pressure of working fluid, that is, the hydraulic pressure, becomes higher than or equal to a predetermined pressure, and returns working fluid to the reservoir 324.

Figure 3:
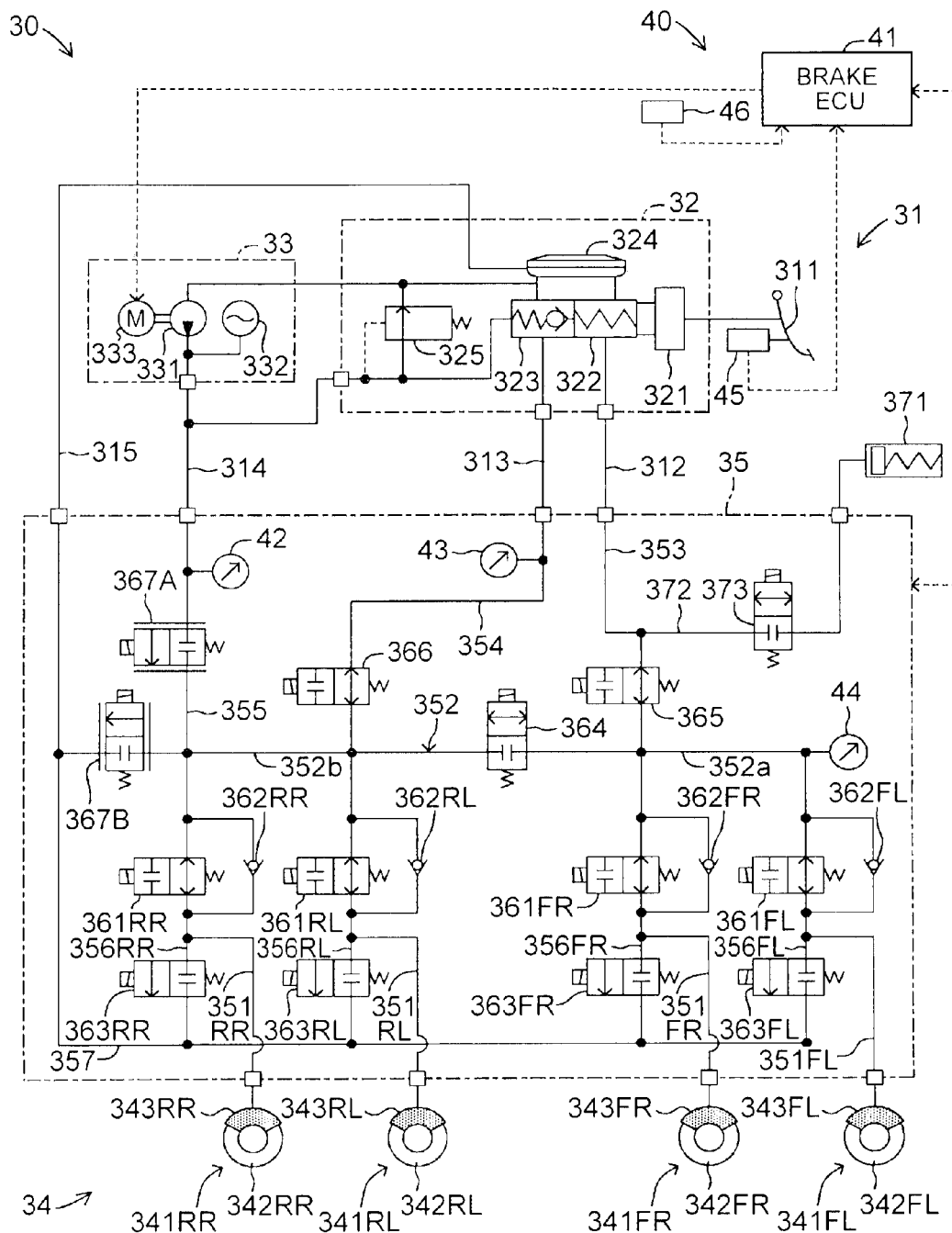
FIG. 3 is a schematic system diagram that mainly shows a hydraulic circuit of a friction brake device shown in FIG. 1.

As shown in FIG. 1 and FIG. 3, the brake unit 34 that generates the friction braking force is formed of disc brake units 341FR, 341FL, 341RR, 341RL respectively provided at the wheels 17. Each of the disc brake units 341FR, 341FL, 341RR, 341RL includes a corresponding one of brake rotors 342FR, 342FL, 342RR, 342RL and a corresponding one of wheel cylinders 343FR, 343FL, 343RR, 343RL, incorporated in a corresponding one of brake calipers. The brake unit 34 is not limited to a configuration that all the four wheels are of a disc brake type. For example, all the four wheels may be of a drum brake type or a selected combination, such as a combination that the front wheels are of a disc brake type and the rear wheels are of a drum brake type, is also applicable. In the following description, for the configuration provided at each wheel 17, FR is suffixed to the reference numerals for the front right wheel, FL is suffixed to the reference numerals for the front left wheel, RR is suffixed to the reference numerals for the rear right wheel, and RL is suffixed to the reference numerals for the rear left wheel; however, those suffixes are omitted if the wheel positions do not need to be particularly specified.

The wheel cylinders 343FR, 343FL, 343RR, 343RL are connected to the hydraulic control valve unit 35, and the hydraulic pressure of working fluid that is supplied from the hydraulic control valve unit 35 is transmitted to the wheel cylinders 343FR, 343FL, 343RR, 343RL. Brake pads that are friction members are pressed against each of the brake rotors 342FR, 342FL, 342RR, 342RL that rotate together with the corresponding wheels 17 by the hydraulic pressure that is supplied from the hydraulic control valve unit 35, and a friction braking force is generated by converting the kinetic energy of the hybrid vehicle 10 to thermal energy.

In this way, the friction brake device 30 includes the master cylinder 322, the regulator 323 and the power hydraulic pressure generating unit 33 as a hydraulic pressure source that applies the hydraulic pressure of working fluid to the wheel cylinders 343. The master cylinder 322 and the regulator 323 utilize a driver's brake depression force (a force depressing the brake pedal 311). The power hydraulic pressure generating unit 33 applies a hydraulic pressure irrespective of the driver's brake depression force. The master cylinder 322, the regulator 323 and the power hydraulic pressure generating unit 33 are connected to the hydraulic control valve unit 35 via the corresponding master line 312, regulator line 313 and accumulator line 314. The reservoir 324 is connected to the hydraulic control valve unit 35 via the reservoir line 315.

As shown in FIG. 3, the hydraulic control valve unit 35 includes four individual flow passages 351FR, 351FL, 351RR, 351RL, a main flow passage 352, a master flow passage 353, a regulator flow passage 354 and an accumulator flow passage 355. The individual flow passages 351FR, 351FL, 351RR, 351RL are respectively connected to the wheel cylinders 343FR, 343FL, 343RR, 343RL. The main flow passage 352 communicates the individual flow passages 351FR, 351FL, 351RR, 351RL with one another. The master flow passage 353 connects the main flow passage 352 to the master line 312. The regulator flow passage 354 connects the main flow passage 352 to the regulator line 313. The accumulator flow passage 355 connects the main flow passage 352 to the accumulator line 314. The master flow passage 353, the regulator flow passage 354 and the accumulator flow passage 355 are connected to the main flow passage 352 in parallel with one another.

ABS holding valves 361FR, 361FL, 361RR, 361RL are respectively provided in the middle portions of the individual flow passages 351FR, 351FL, 351RR, 351RL. Each of the ABS holding valves 361 is a normally open electromagnetic on-off valve that keeps its open state by the use of the urging force of a spring when a solenoid is not energized and that becomes its closed state only when the solenoid is energized. Each of the ABS holding valves 361 is able to bidirectionally flow working fluid in the open state, and has no directivity.

Return check valves 362FR, 362FL, 362RR, 362RL are respectively provided in the individual flow passages 351FR, 351FL, 351RR, 351RL in parallel with the ABS holding valves 361FR, 361FL, 361RR, 361RL. Each of the return check valves 362 is a valve that interrupts flow of working fluid from the main flow passage 352 to a corresponding one of the wheel cylinders 343, and that allows flow of working fluid from a corresponding one of the wheel cylinders 343 toward the main flow passage 352. That is, a valve element mechanically opens to flow working fluid in a corresponding one of the wheel cylinders 343 toward the main flow passage 352 when the hydraulic pressure of the corresponding one of the wheel cylinders 343 (hereinafter, referred to as wheel cylinder pressure) is higher than the hydraulic pressure in the main flow passage 353; whereas the valve element closes when the wheel cylinder pressure is lower than or equal to the hydraulic pressure in the main flow passage 352. Thus, while the ABS holding valves 361 are closed and the wheel cylinder pressures are held, when a control pressure in the main flow passage 352 decreases and becomes lower than the wheel cylinder pressures, it is possible to decrease the wheel cylinder pressures to the control pressure in the main flow passage 352 while the ABS holding valves 361 are kept closed.

Pressure reducing individual flow passages 356FR, 356FL, 356RR, 356RL are respectively connected to the individual flow passages 351FR, 351FL, 351RR, 351RL. The pressure reducing individual flow passages 356 are connected to a reservoir flow passage 357. The reservoir flow passage 357 is connected to the reservoir 324 via the reservoir line 315. ABS pressure reducing valves 363FR, 363FL, 363RR, 363RL are respectively provided in the middle portions of the pressure reducing individual flow passages 356FR, 356FL, 356RR, 356RL. Each of the ABS pressure reducing valves 363 is a normally closed electromagnetic on-off valve that keeps its closed state by the use of the urging force of a spring when a solenoid is not energized and that becomes its open state only when the solenoid is energized. Each of the ABS pressure reducing valves 363 reduces a corresponding one of the wheel cylinder pressures by flowing working fluid from a corresponding one of the wheel cylinders 343 to the reservoir flow passage 357 via a corresponding one of the pressure reducing individual flow passages 356 in the open state.

Each ABS holding valve 361 and each ABS pressure reducing valve 363 undergo open/close control, for example, when anti-lock brake control is activated in the case where the corresponding wheel 17 tends to lock (that is, the corresponding wheel 17 tends to slip). In anti-lock brake control, lock of the wheel 17 is prevented by reducing a corresponding one of the wheel cylinder pressures.

A communication valve 364 is provided in the middle portion of the main flow passage 352. The communication valve 364 is a normally closed electromagnetic on-off valve that keeps its closed state by the use of the urging force of a spring when a solenoid is not energized and that becomes its open state only when the solenoid is energized. The main flow passage 352 is divided into a first main flow passage 352a and a second main flow passage 352b. The first main flow passage 352a is a one-side portion of the main flow passage 352 with respect to the communication valve 364, and is connected to the master flow passage 353. The second main flow passage 352b is the other-side portion of the main flow passage 352 with respect to the communication valve 364, and is connected to the regulator flow passage 354 and the accumulator flow passage 355. When the communication valve 364 is in the closed state, flow of working fluid is interrupted between the first main flow passage 352a and the second main flow passage 352b. When the communication valve 364 is in the open state, flow of working fluid is bidirectionally allowed between the first main flow passage 352a and the second main flow passage 352b.

A master cut valve 365 is provided in the middle portion of the master flow passage 353. The master cut valve 365 is a normally open electromagnetic on-off valve that keeps its open state by the use of the urging force of a spring when a solenoid is not energized and that becomes its closed state only when the solenoid is energized. When the master cut valve 365 is in the closed state, flow of working fluid is interrupted between the master cylinder 322 and the first main flow passage 352a. When the master cut valve 365 is open, flow of working fluid is bidirectionally allowed between the master cylinder 322 and the first main flow passage 352a.

A stroke simulator 371 is provided in the master flow passage 353 on the master cylinder 322 side with respect to a location at which the master cut valve 365 is provided. The stroke simulator 371 allows driver's stroke operation of the brake pedal 311, and provides driver's high brake operation feeling by generating reaction force based on a pedal operation amount. Therefore, the stroke simulator 371 is connected via a simulator flow passage 372 and a simulator cut valve 373. The simulator flow passage 372 is branched off from the master flow passage 353. The simulator cut valve 373 is a normally closed electromagnetic on-off valve that is provided in the simulator flow passage 372.

A regulator cut valve 366 is provided in the middle portion of the regulator flow passage 354. The regulator cut valve 366 is a normally open electromagnetic on-off valve that keeps its open state by the use of the urging force of a spring when a solenoid is not energized and that becomes its closed state only when the solenoid is energized. When the regulator cut valve 366 is in the closed state, flow of working fluid is interrupted between the regulator 323 and the second main flow passage 352b. When the regulator cut valve 366 is in the open state, flow of working fluid is bidirectionally allowed between the regulator 323 and the second main flow passage 352b.

A pressure intensifying linear control valve 367A is provided in the middle portion of the accumulator flow passage 355. The second main flow passage 352b, to which the accumulator flow passage 355 is connected, is connected to the reservoir flow passage 357 via a pressure reducing linear control valve 367B. Each of the pressure intensifying linear control valve 367A and the pressure reducing linear control valve 367B is a normally closed electromagnetic on-off valve that keeps its closed state by the use of the urging force of a spring when a solenoid is not energized and that increases its opening degree in accordance with an increase in the amount of energization (the value of current) to the solenoid. Each of the pressure intensifying linear control valve 367A and the pressure reducing linear control valve 367B keeps its closed state by the use of a valve closing force that is a difference between a spring force that the spring urges the valve element in the valve closing direction and a differential pressure force that the valve element is urged in the valve opening direction by a differential pressure between a primary side (inlet side) in which relatively high-pressure working fluid flows and a secondary side (outlet side) in which relatively low-pressure working fluid flows.

On the other hand, each of the pressure intensifying linear control valve 367A and the pressure reducing linear control valve 367B opens at the opening degree based on the balance of forces that act on the valve element when an electromagnetic attraction force that is generated by energization of the solenoid and that acts in the direction in which the valve element is opened exceeds the valve closing force, that is, when the relationship Electromagnetic attraction force>Valve closing force (=Spring force−Differential pressure force) is satisfied. Thus, each of the pressure intensifying linear control valve 367A and the pressure reducing linear control valve 367B is able to adjust the opening degree based on the differential pressure force, that is, the differential pressure between the primary side (inlet side) and the secondary side (outlet side) by controlling the amount of energization (the value of current) to the solenoid. In the following description, when the pressure intensifying linear control valve 367A and the pressure reducing linear control valve 367B do not need to be distinguished from each other, these are simply referred to as the linear control valves 367.

As shown in FIG. 1, a control device 40 that serves as a control unit is mounted on the hybrid vehicle 10. As shown in FIG. 1, the control device 40 is configured to include a brake ECU 41. The brake ECU 41 includes a microcomputer, formed of a CPU, a ROM, a RAM, a timer, and the like, as a major component, and includes a drive circuit, an interface, a communication interface, and the like. The drive circuit drives the friction brake device 30. Various sensor signals are input to the interface. The control device 40 is connected to the power converter 19 (the power supply circuit 20 and the main switch 21) via the communication interface. The power converter 19 is mounted on the hybrid vehicle 10. Thus, the brake ECU 41 according to the present embodiment also directly controls the regenerative braking force by the motor generator 14 via the power converter 19 (the power supply circuit 20).

The brake ECU 41 is connected to the electromagnetic on-off valves and linear control valves provided in the friction brake device 30 mounted on the hybrid vehicle 10 via a drive circuit, controls the open/closed states and opening degrees by outputting solenoid driving signals, and causes the friction brake device 30 to exercise the friction braking force by controlling the wheel cylinder pressures in the respective wheel cylinders 343. The motor 333 provided in the power hydraulic pressure generating unit 33 is also connected to the brake ECU 41 via a drive circuit, and is controlled and driven by a motor driving signal that is output from the brake ECU 41.

As shown in FIG. 3, the control device 40 includes an accumulator pressure sensor 42, a regulator pressure sensor 43 and a control pressure sensor 44. The accumulator pressure sensor 42 detects an accumulator pressure Pacc that is the pressure of working fluid (hydraulic pressure) in the accumulator flow passage 355 on the power hydraulic pressure generating unit 33 side (upstream side) with respect to the pressure intensifying linear control valve 367A. The accumulator pressure sensor 42 outputs a signal indicating the detected accumulator pressure Pacc to the brake ECU 41. Thus, the brake ECU 41 loads the accumulator pressure Pacc at predetermined intervals, pressurizes working fluid with the pump 331 by driving the motor 333 when the accumulator pressure Pacc becomes lower than a preset minimum setting pressure, and controls the accumulator pressure Pacc such that the accumulator pressure Pacc is constantly kept within a setting pressure range.

The regulator pressure sensor 43 detects a regulator pressure Preg that is the pressure of working fluid in the regulator flow passage 354 on the regulator 323 side (upstream side) with respect to the regulator cut valve 366. The regulator pressure sensor 43 outputs a signal indicating the detected regulator pressure Preg to the brake ECU 41. The control pressure sensor 44 outputs a signal indicating a control pressure Px to the brake ECU 41. The control pressure Px is the pressure of working fluid in the first main flow passage 352a.

As shown in FIG. 3, a pedal stroke sensor 45 provided at the brake pedal 311 is connected to the brake ECU 41. The pedal stroke sensor 45 detects a pedal stroke Sp that is the depression amount (operation amount) of the brake pedal 311 in driver's brake operation. The pedal stroke sensor 45 outputs a signal indicating the detected pedal stroke Sp to the brake ECU 41. A wheel speed sensor 46 is connected to the brake ECU 41. The wheel speed sensor 46 detects a vehicle speed V of the hybrid vehicle 10. The wheel speed sensor 46 detects a wheel speed that is the rotation speed of each of the right, left, front and rear wheels, and outputs a signal indicating the detected wheel speed Vx to the brake ECU 41.

As shown in FIG. 1, the control device 40 that serves as the control unit is configured to include a hybrid ECU 47. The hybrid ECU 47 also includes a microcomputer, formed of a CPU, a ROM, a RAM, and the like, as a major component. As will be described later, the hybrid ECU 47 controls the hybrid vehicle 10 overall by, for example, interrupting the power converter 19 (the power supply circuit 20). Detailed control over the hybrid vehicle 10 by the hybrid ECU 47 and the operation of the hybrid ECU 47 in association with the control are not directly relevant to the invention, so the description is omitted.

Next, the control device 40 according to the present embodiment, more specifically, regenerative brake cooperative control that is executed by the brake ECU 41 and the hybrid ECU 47, will be described. The brake ECU 41 executes regenerative brake cooperative control (hereinafter, also simply referred to as cooperative control) for causing the regenerative braking force and the friction braking force to cooperate with each other. The regenerative braking force is generated when the motor generator 14 controls regeneration (energization). The friction braking force is generated when the friction brake device 30 adjusts the hydraulic pressure of each wheel cylinder 343.

In cooperative control, the brake ECU 41 keeps the master cut valve 365 and regulator cut valve 366 of the friction brake device 30 in the closed state by energizing the corresponding solenoids, and keeps the communication valve 364 in the open state by energizing the corresponding solenoid. The brake ECU 41 keeps the simulator cut valve 373 in the open state by energizing the solenoid. The brake ECU 41 controls the pressure intensifying linear control valve 367A and the pressure reducing linear control valve 367B to opening degrees based on the amounts of energization of the corresponding solenoids through energization control. During normal times, the brake ECU 41 keeps the ABS holding valves 361 in the open state, and keeps the ABS pressure reducing valves 363 in the closed state. The brake ECU 41, where necessary, controls the open/closed states of the ABS holding valves 361 and ABS pressure reducing valves 363 in accordance with known anti-lock brake control, or the like.

Here, in cooperative control, the master cut valve 365 and the regulator cut valve 366 both are kept in the closed state, so the hydraulic pressure that is output from the master cylinder unit 32 is not transmitted to the wheel cylinders 343. In cooperative control, the communication valve 364 is kept in the open state, and the pressure intensifying linear control valve 367A and the pressure reducing linear control valve 367B are placed in an energization control state. Therefore, the hydraulic pressure (that is, the accumulator pressure) that is output from the power hydraulic pressure generating unit 33 is regulated by the pressure intensifying linear control valve 367A and the pressure reducing linear control valve 367B, and is transmitted to the four wheel cylinders 343. In this case, the wheel cylinders 343 communicate with one another via the main flow passage 352, so all the wheel cylinder pressures have the same value among the four wheels. This wheel cylinder pressure is allowed to be detected by the control pressure sensor 44.

Upon reception of a braking request, the brake ECU 41 applies a braking force to the wheels 17 by causing the regenerative braking force that is generated by the motor generator 14 of the hybrid vehicle 10 and the friction braking force that is generated by the friction brake device 30 to cooperate with each other, thus controlling braking of the hybrid vehicle 10. The braking request is, for example, issued when a braking force should be applied to the vehicle, such as when a brake operation is conducted by the driver. Upon reception of a braking request, the brake ECU 41 acquires the pedal stroke Sp of the brake pedal 311, which is detected by the pedal stroke sensor 45 as a result of driver's brake operation, as a parameter indicating a state associated with braking, and computes a regenerative braking force on the basis of the pedal stroke Sp. The regenerative braking force is set to a larger value as the pedal stroke Sp increases, and is achieved by combining the regenerative braking force and the friction braking force with each other. Instead of using the pedal stroke Sp that is detected by the pedal stroke sensor 45 as a result of driver's brake operation, it is also allowed to detect the regulator pressure Preg that is detected by the regulator pressure sensor 43 as a result of brake operation as the parameter indicating the state associated with braking. Other than that, it is also allowed to detect a depression force as the parameter indicating the state associated with braking by providing a depression force sensor that detects the depression force of the brake pedal 311 as a result of brake operation.

The brake ECU 41 according to the present embodiment transmits information indicating the computed regenerative braking force to the hybrid ECU 47. The hybrid ECU 47 computes a braking force that is generated by controlling energization of the motor generator 14, more specifically, regeneration of electric power, within the regenerative braking force, and transmits information indicating the regenerative braking force that is the computed result to the brake ECU 41. Thus, the brake ECU 41 computes a target friction braking force by subtracting the regenerative braking force from the target braking force. The target friction braking force is a friction braking force that should be generated by the friction brake device 30. The regenerative braking force that is generated by regenerating electric power (through energization control) in cooperative control varies with not only the rotation speed of the motor generator 14 but also the state of charge (SOC) of the electrical storage device 18, or the like. Thus, by subtracting the regenerative braking force from the regenerative braking force that is determined in correspondence with driver's brake operation, it is possible to compute the appropriate target friction braking force.

The brake ECU 41 controls energization of the motor generator 14 in cooperation with the hybrid ECU 47 or directly controls energization via the power converter 19 that is the energization path in order to generate the above-described regenerative braking force. On the other hand, the brake ECU 41 computes a target hydraulic pressure of each wheel cylinder 343, corresponding to the target friction braking force, on the basis of the computed target friction braking force. The brake ECU 41 controls the amount of energization of the pressure intensifying linear control valve 367A and the amount of energization of the pressure reducing linear control valve 367B through feedback control such that the wheel cylinder pressure is equal to the computed target hydraulic pressure. That is, the brake ECU 41 controls the amounts of energization of the solenoids of the pressure intensifying linear control valve 367A and pressure reducing linear control valve 367B such that the control pressure Px (=the wheel cylinder pressure) detected by the control pressure sensor 44 follows the target hydraulic pressure. Thus, working fluid is supplied from the power hydraulic pressure generating unit 33 to the wheel cylinders 343 via the pressure intensifying linear control valve 367A, and the friction braking force is applied to the wheels 17. Thus, during normal times, the brake ECU 41 is able to apply the braking force, corresponding to driver's brake operation, to the wheels 17 through cooperative control, and is able to appropriately brake the hybrid vehicle 10.

Incidentally, the occupant including the driver is allowed to conduct a specific operation of the main switch 21 in the hybrid vehicle 10 in traveling in order to change from an energized state to a non-energized state, that is, in order to interrupt (shut down) the power supply circuit 20 of the power converter 19. In the energized state, a plurality of electrical devices mounted on the vehicle 10 are energized from the electrical storage device 18. In the non-energized state, energization is interrupted. The specific operation is a combination of a plurality of operations of the main switch 21, conducted by the occupant, within a preset threshold time.

Specifically, the occupant is allowed to, for example, conduct repeated pressing operation that is the specific operation including a combination of operations to press the operation button of the main switch 21 (pressing operations). In the repeated pressing operation, the pressing operation is repeated N times larger than or equal to twice within the threshold time, in the hybrid vehicle 10 in traveling. Alternatively, the occupant is allowed to, for example, conduct the specific operation including a combination of the pressing operation of the operation button of the main switch 21 and an operation to keep a state where the operation button is held down (so-called press-and-holding operation). In the specific operation, the press-and-holding operation is conducted subsequently to the pressing operation within the threshold time, in the hybrid vehicle 10 in traveling. In the following description, when the occupant conducts the specific operation of the main switch 21, the power supply circuit 20 is shut down by the hybrid ECU 47, that is, the energization path is interrupted by the hybrid ECU 47, so the specific operation is also referred to as power-off operation.

In the hybrid vehicle 10, when the above-described plurality of operations are conducted by the occupant and then the power-off operation (specific operation) has been completed, that is, for example, when the number of pressing operations of the operation button of the main switch 21 has reached N, the hybrid ECU 47 shuts down the power supply circuit 20 of the power converter 19. That is, when the driver's power-off operation has completed, the hybrid ECU 47 preferentially stops the operations of the motor generators 13, 14. Therefore, it is assumed that the occupant has, for example, conducted the pressing operation of the operation button of the main switch 21 M times (M<N) while the driver is not conducting brake operation in the hybrid vehicle 10. In this situation, when the occupant further presses the operation button of the main switch 21 thereafter while the driver is conducting brake operation and then the number of times of pressing operations becomes N within the threshold time, the power-off operation may complete.

As a result, in the hybrid vehicle 10 according to the related art, the hybrid ECU interrupts energization of the motor generator 14 while the driver is conducting brake operation, so the regenerative braking force may rapidly reduce. In this case, the brake ECU 41 increases the friction braking force that is generated by the friction brake device 30 in accordance with cooperative control; however, there is a possibility the deceleration of the hybrid vehicle 10 fluctuates. As a result, the occupant senses the fluctuations in the deceleration of the hybrid vehicle 10 and experiences an uncomfortable feeling of strangeness. This will be specifically described with reference to FIG. 4. In the following description, an example in which the power-off operation (specific operation) of the main switch 21 is the repeated pressing operation in which the operation button is repeatedly pressed N times (for example, twice) will be described.

At the time of causing the hybrid vehicle 10 to travel, the driver (occupant) initially presses the main switch 21 as a travel starting operation after getting on the vehicle. Thus, the hybrid ECU 47 starts up the power supply circuit 20 and sets the power supply circuit 20 in an energized state, and the hybrid vehicle 10 enters a travel starting ready state, that is, a so-called ready-on state. In the ready-on state, the driver is allowed to cause the hybrid vehicle 10 to travel by operating an accelerator pedal (not shown). In the following description, the travel starting operation in which the driver (occupant) presses the operation button of the main switch 21 in order to set the hybrid vehicle 10 in the ready-on state is referred to as power-on operation, and is distinguished from the power-off operation that is the specific operation. The brake ECU 41 stores ready-on history information in a predetermined storage position of the RAM. The ready-on history information indicates timing (history) at which the power-on operation of the main switch 21 is conducted by the driver (occupant).

When the driver (occupant) presses the operation button of the main switch 21 N times within the threshold time (within several seconds) in the hybrid vehicle 10 that is traveling in the ready-on state in this way, the power-off operation completes. In this case, as described above, the hybrid ECU 47 shuts down the power supply circuit 20 and preferentially stops the operations of the motor generators 13, 14 in response to the completion of the power-off operation. Therefore, when the power-off operation has completed while the brake ECU 41 is braking the hybrid vehicle 10 in traveling through cooperative control in response to driver's brake operation, the regenerative braking force that is generated by the motor generator 14 rapidly reduces as indicated by the alternate long and short dashed line in FIG. 4.

Therefore, in the hybrid vehicle 10 according to the related art, the brake ECU 41 increases the friction braking force that is generated by the friction brake device 30 as the operation of the motor generator 14 is stopped by the hybrid ECU 47 during cooperative control. For the timing at which the completed power-off operation is detected, the hybrid ECU 47 detects (determines) the power-off operation at earlier timing than the brake ECU 41 does. That is, as shown in FIG. 4, the hybrid ECU 47 detects (determines) the completed power-off operation at predetermined timing T1, and the brake ECU 41 detects (determines) the power-off operation at timing T2 later than the predetermined timing T1.

Figure 4:
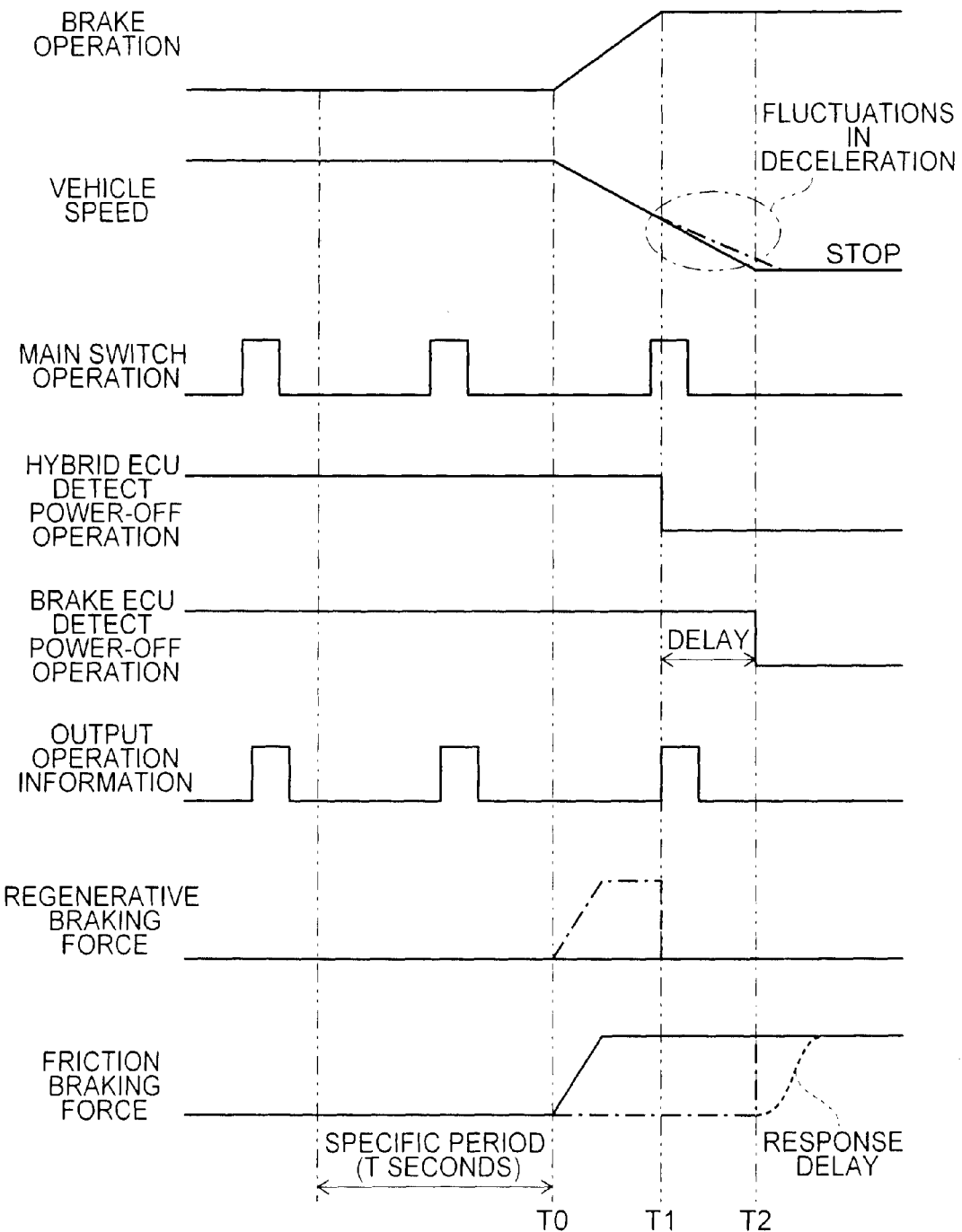
FIG. 4 is a time chart that illustrates brake control that is executed by a control device shown in FIG. 1 according to the embodiment of the invention.

Thus, in the hybrid vehicle 10 according to the related art, as indicated by the alternate long and short dashed line in FIG. 4, a temporary reduction in the braking force that is applied to the wheels 17 occurs in the period from the predetermined timing T1 to the timing T2. At the predetermined timing T1, the hybrid ECU 47 shuts down the power supply circuit 20 and the regenerative braking force that is generated by the motor generator 14 becomes zero. At the timing T2, the brake ECU 41 increases the friction braking force by operating the friction brake device 30. As indicated by the dashed line in the friction braking force in FIG. 4, when the brake ECU 41 increases the friction braking force that is generated by the friction brake device 30, there occurs a response delay in intensifying the wheel cylinder pressure (hydraulic pressure). Therefore, the friction braking force has not sufficiently increased at the timing passing by the timing T2, and there occurs the state where the braking force that is applied to the wheels 17 is reduced. As a result, the occupant senses fluctuations in deceleration, resulting from a temporary reduction in the braking force (see the predetermined timing T1 to the timing T2 in the vehicle speed surrounded by the alternate long and short dashed line in FIG. 4) and experiences an uncomfortable feeling of strangeness.

In the hybrid vehicle 10 according to the present embodiment, as show in FIG. 4, when the brake ECU 41 starts braking in response to driver's brake operation, the brake ECU 41 determines (detects) whether the operation button of the main switch 21 has been pressed by the occupant M times (for example, once) within a specific period back from braking start timing T0 at which braking is started. That is, the brake ECU 41 is able to determine whether there is a high possibility that the power-off operation completes thereafter by determining whether the pressing operation has been detected M times (M<N) within the specific period in the power-off operation (specific operation) that completes when the operation button of the main switch 21 is pressed N times within the threshold time. In the hybrid vehicle 10 according to the present embodiment, when the operation button of the main switch 21 has been pressed M times within the specific period, the brake ECU 41 prohibits generation of the regenerative braking force by the motor generator 14, and achieves the required braking force by the use of only the friction braking force that is generated by the friction brake device 30, as shown in FIG. 4. Hereinafter, the operation of the brake ECU 41 will be described in detail with reference to the flowchart shown in FIG. 5.

Figure 5:
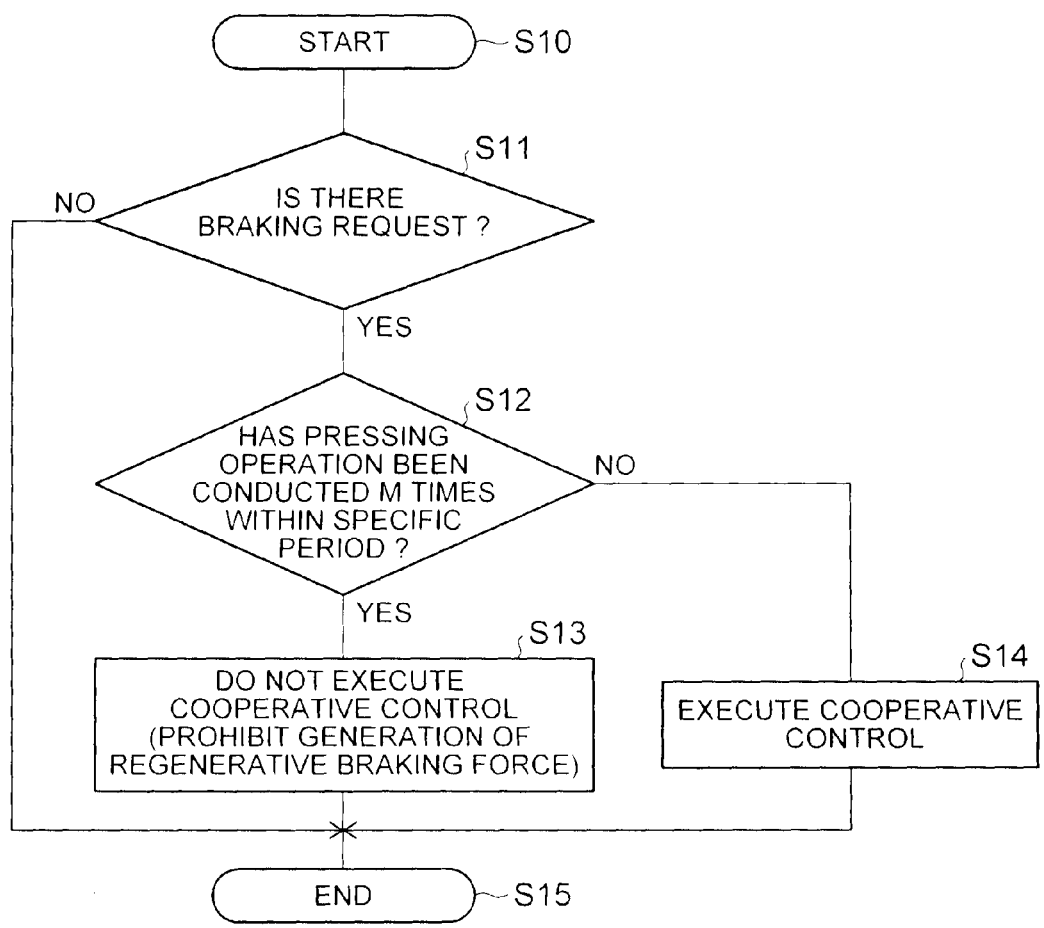
FIG. 5 is a flowchart of a control program that is executed by the control device (brake ECU) shown in FIG. 1 according to the embodiment of the invention.

The brake ECU 41 (more specifically, the CPU) of the hybrid vehicle 10 according to the present embodiment starts the control program shown in FIG. 5 in step S10, and repeatedly executes the control program at predetermined short time intervals. Specifically, the brake ECU 41 starts executing the control program in step S10, and determines in subsequent step S11 whether to start braking, in other words, whether there is a braking request. That is, when the brake ECU 41 has received the braking request, the brake ECU 41 makes affirmative determination, and proceeds to step S12. On the other hand, when the brake ECU 41 has not received the braking request, the brake ECU 41 makes negative determination, and proceeds to step S5, after which the brake ECU 41 once ends executing the control program. The brake ECU 41 starts executing the control program in step S10 after a lapse of a predetermined short time.

In step S12, the brake ECU 41 determines whether the operation button of the main switch 21 has been pressed M times within the specific period in accordance with the determination process of step S11. The specific period is determined by the braking start timing T0, at which braking of the hybrid vehicle 10 is started, and timing back from the braking start timing T0 by T1 seconds (specifically a time shorter than or equal to the threshold time). Hereinafter, the determination process will be specifically described.

The brake ECU 41 acquires operation information indicated by a signal that is output from the main switch 21 each time the operation button is pressed by the occupant as shown in FIG. 4, and stores the acquired operation information in, for example, a predetermined storage position of the RAM in time sequence. Therefore, the brake ECU 41 extracts the operation information acquired within the specific period, that is, in the period from the braking start timing T0 to the timing back by T seconds, among the pieces of operation information stored in time sequence in step S12. The brake ECU 41 determines whether the number of the extracted pieces of operation information, that is, the number of times that the operation button of the main switch 21 has been pressed by the occupant, is M.

In accordance with the determination, when the operation button of the main switch 21 has been pressed M times within the specific period, the brake ECU 41 makes affirmative determination, and proceeds to step S13. On the other hand, when the operation button of the main switch 21 has been pressed only the number of times smaller than M within the specific period, the brake ECU 41 makes negative determination, and proceeds to step S14.

In step S13, the brake ECU 41 prohibits generation of the regenerative braking force by the motor generator 14, and generates the required braking force by the use of the friction braking force that is generated by the friction brake device 30. In other words, the brake ECU 41 does not execute cooperative control for adjusting the regenerative braking force and the friction braking force in step S13. That is, in accordance with the determination result of step S12, the brake ECU 41 determines that there is a high possibility that the operation button is further depressed and the power-off operation completes later because the pressing operation has been already conducted M times at present for the power-off operation that completes when the operation button of the main switch 21 is pressed N times.

Therefore, the brake ECU 41 prohibits generation of the regenerative braking force by the motor generator 14 in advance at the braking start timing T0 before the predetermined timing T1 as shown in FIG. 4 such that the required braking force that should be applied to the wheels 17 in response to driver's brake operation does not fluctuate. Thus, the brake ECU 41 computes a target hydraulic pressure of each wheel cylinder 343, corresponding to the target friction braking force equal to the required braking force. In step S13, the brake ECU 41 supplies hydraulic pressure to each wheel cylinder 343 by operating the friction brake device 30 such that the wheel cylinder pressure is equal to the computed target hydraulic pressure, and applies the friction braking force equal to the required braking force to the wheels 17.

In this way, when the brake ECU 41 prohibits generation of the regenerative braking force by the motor generator 14 and, on the other hand, generates the friction braking force by the friction brake device 30, the brake ECU 41 proceeds to step S15. The brake ECU 41 once ends executing the control program, and starts executing the control program in step S10 after a lapse of the predetermined short time.

In step S14, the brake ECU 41 generates the required braking force by adjusting the regenerative braking force that is generated by the motor generator 14 and the friction braking force that is generated by the friction brake device 30 by executing the above-described cooperative control. That is, the brake ECU 41 determines that there is a low possibility that the power-off operation completes in accordance with the determination result of step S12, and causes the motor generator 14 to generate the regenerative braking force. In this way, when the brake ECU 41 generates the required braking force through cooperative control, the brake ECU 41 proceeds to step S15, after which the brake ECU 41 once ends executing the control program. The brake ECU 41 starts executing the control program in step S10 after a lapse of the predetermined short time.

As can be understood from the above description, according to the above-described embodiment, the brake ECU 41 is able to prohibit generation of the regenerative braking force, which rapidly reduces as a result of interruption of energization of the motor generator 14, previously (in advance) in a situation that there is a high possibility that the specific operation completes. Thus, in a situation that there is a high possibility that the specific operation completes, the brake ECU 41 is able to achieve the required braking force by the use of the friction braking force and not to cause the braking force (the required braking force) that is applied to the wheels 17 to fluctuate even when energization of the motor generator 14 is interrupted at the predetermined timing T0. As a result, it is possible to reliably suppress fluctuations in the deceleration of the vehicle, resulting from a rapid reduction in the regenerative braking force, so it is possible to prevent the occupant from experiencing a feeling of strangeness.

First Alternative Embodiment

In the above-described embodiment, when the operation button of the main switch 21 has been pressed M (M<N) times within the specific period, the brake ECU 41 determines that there is a high possibility that the number of times of the operation becomes N and the power-off operation (specific operation) completes. In addition, in the above-described embodiment, the brake ECU 41 previously prohibits generation of the regenerative braking force that is generated by the motor generator 14 because there is a high possibility that the power supply circuit 20 is shut down by the hybrid ECU 47 as a result of completion of the power-off operation (specific operation) and the regenerative braking force that is generated by the motor generator 14 rapidly reduces.

Incidentally, as described above, when the power-on operation that is the travel starting operation is the pressing operation of the operation button of the main switch 21, the pressing operation regarding the power-on operation is the same as the pressing operation regarding the power-off operation. For example, it is assumed that the driver conducts brake operation immediately after the driver conducts the power-on operation to set the hybrid vehicle 10 in the ready-on state and causes the vehicle to start traveling. In this case, the brake ECU 41 may determine the pressing operation regarding the power-on operation as the pressing operation regarding the power-off operation within the specific period and, as a result, may determine in step S12 in the control program according to the above-described embodiment that the operation button of the main switch 21 has been pressed M times.

Thus, there is a case that, although the pressing operation is required to cause the hybrid vehicle 10 to travel and the driver (occupant) does not intend to shut down the power supply circuit 20, the brake ECU 41 prohibits generation of the regenerative braking force by the motor generator 14. In this case, it is not possible to recover regenerative electric power via the motor generator 14 and, as a result, for example, it is not possible to suppress deterioration of fuel economy by consuming regenerative electric power.

Therefore, in the first alternative embodiment, the brake ECU 41 distinguishes the pressing operation regarding the power-on operation from the pressing operation regarding the power-off operation and, particularly, prevents the pressing operation regarding the power-on operation from being counted as the pressing operation regarding the power-off operation within the specific period. Hereinafter, the first alternative embodiment will be specifically described. Like reference numerals denote the same portions as those of the above-described embodiment, and the detailed description is omitted.

Figure 6:
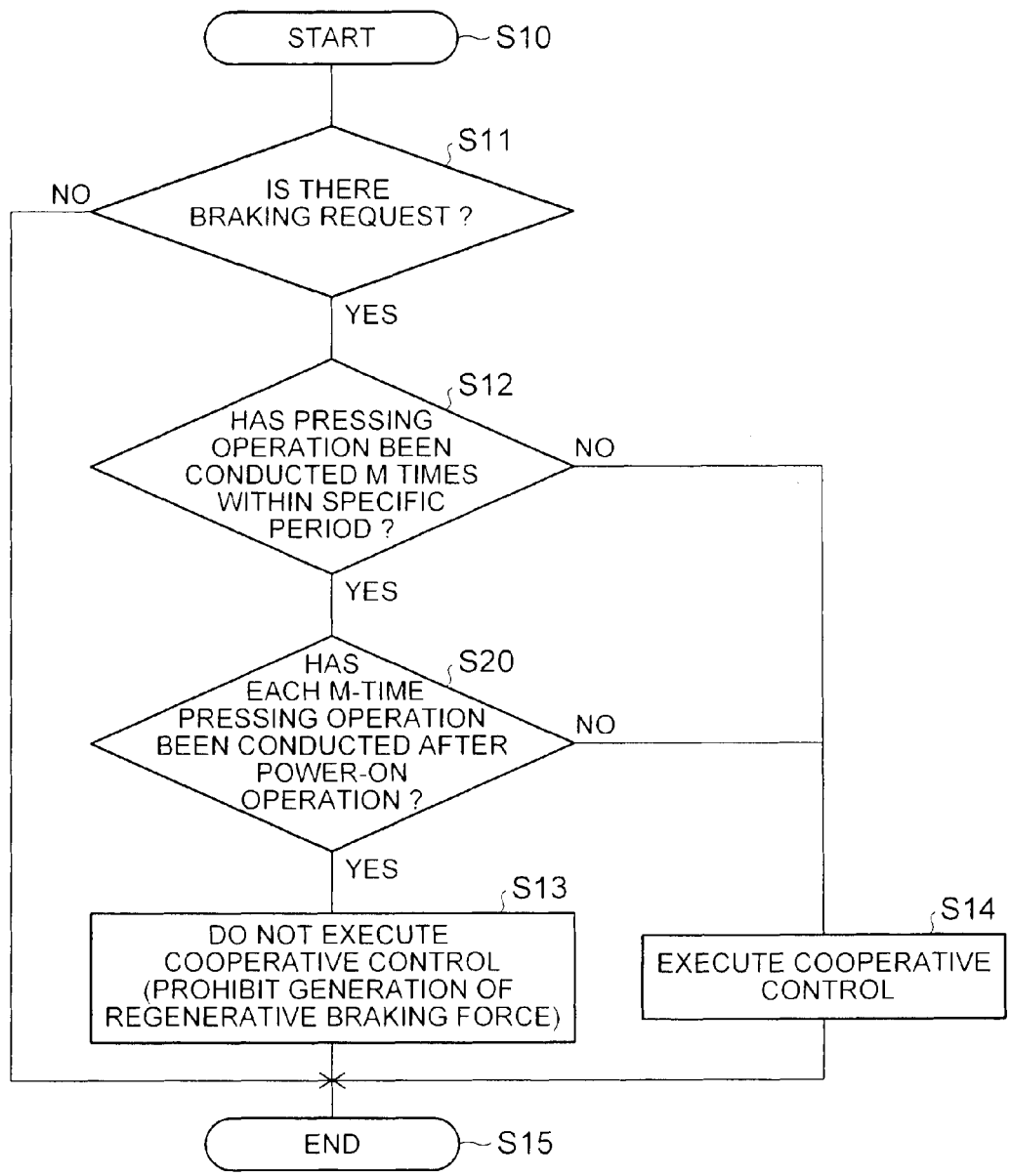
FIG. 6 is a flowchart of a control program that is executed by the control device (brake ECU) shown in FIG. 1 according to a first alternative embodiment to the embodiment of the invention.

In the first alternative embodiment, the brake ECU 41 repeatedly executes the control program shown in FIG. 6 each time a predetermined short time elapses. As shown in FIG. 6, the control program according to the first alternative embodiment differs from the control program according to the above-described embodiment in that step S20 is added. Thus, hereinafter, the added step S20 will be mainly described.

In this first alternative embodiment as well, the brake ECU 41 starts executing the control program in step S10, and makes affirmative determination in subsequent step S11 and proceeds to step S12 when the brake ECU 41 has acquired a braking request. The brake ECU 41 makes affirmative determination in step S12 and proceeds to step S20 when the operation button of the main switch 21 has been pressed M times within the specific period.

In step S20, the brake ECU 41 determines whether the M-time pressing operations determined in step S12 each are the pressing operation after the power-on operation is conducted, in other words, whether the pressing operation regarding the power-on operation is included in the M-time pressing operations conducted within the specific period. More specifically, as described above, the brake ECU 41 stores the ready-on history information indicating the history of the driver's (occupant's) power-on operation of the main switch 21 in the predetermined storage position of the RAM. The ready-on history information is stored at timing at which the driver (occupant) sets the hybrid vehicle 10 in the ready-on state in order to cause the hybrid vehicle 10 to travel, that is, timing at which the operation button of the main switch 21 is pressed by the driver (occupant) for the first time. On the other hand, as described above, the brake ECU 41 stores the operation information in the predetermined storage position of the RAM in time sequence each time the operation button of the main switch 21 is pressed.

Thus, the brake ECU 41 uses the ready-on history information and the operation information that are respectively stored in the predetermined storage positions of the RAM, and determines whether the M-time pressing operations conducted within the specific period and determined in step S12 each are conducted after the driver's (occupant's) pressing operation regarding the power-on operation. In other words, the brake ECU 41 uses the ready-on history information and the operation information, and determines whether the pressing operation regarding the power-on operation is included (counted) in the M-time pressing operations conducted within the specific period and determined in step S12.

Specifically, the brake ECU 41 makes affirmative determination and proceeds to step S13 when the M-time pressing operations conducted within the specific period and determined in step S12 each are conducted after the power-on operation, in other words, when the power-on operation has been conducted before the specific period and the pressing operation regarding the power-on operation is not included in the M-time pressing operations. In step S13, as in the case of the above-described embodiment, the brake ECU 41 prohibits generation of the regenerative braking force by the motor generator 14 and, on the other hand, generates the friction braking force equal to the required braking force by the friction brake device 30. That is, the brake ECU 41 does not execute cooperative control in step S13 because the brake ECU 41 determines in step S20 that the M-time pressing operations conducted within the specific period each are the occupant's pressing operation regarding the power-off operation.

On the other hand, the brake ECU 41 makes negative determination and proceeds to step S14 when the pressing operation regarding the power-on operation is included in the M-time pressing operations conducted within the specific period and determined in step S12. In step S14, as in the case of the above-described embodiment, the brake ECU 41 generates the required braking force by adjusting the regenerative braking force that is generated by the motor generator 14 and the friction braking force that is generated by the friction brake device 30. That is, the brake ECU 41 executes cooperative control in step S14 because the brake ECU 41 determines in step S20 that the occupant's pressing operation regarding the power-on operation is included in the M-time pressing operations conducted within the specific period and there is a low possibility that the power-off operation (specific operation) completes.

As can be understood from the above description, according to the above-described first alternative embodiment, at the time of braking the hybrid vehicle 10 immediately after the start of traveling, even when the pressing operation regarding the power-on operation is conducted within the specific period, the brake ECU 41 does not count (detect) the pressing operation regarding the power-on operation as the pressing operation regarding the power-off operation. As a result, it is possible to increase an opportunity to achieve the required braking force by the use of both the regenerative braking force and the friction braking force. Thus, it is possible to actively recover regenerative electric power resulting from generation of the regenerative braking force, so it is possible to suppress deterioration of the fuel consumption rate (fuel economy) of the hybrid vehicle 10 by consuming the recovered regenerative electric power.

Second Alternative Embodiment

In the above-described embodiment, the brake ECU 41 determines that there is a high possibility that the number of times of the operation becomes N and the power-off operation (specific operation) completes when the operation button of the main switch 21 has been pressed M (I<N) times within the specific period. In contrast, in the above-described first alternative embodiment, the brake ECU 41 determines whether the pressing operation regarding the power-on operation is included in the M-time pressing operations conducted within the specific period. When the pressing operation regarding the power-on operation is not included in the M-time pressing operations, the brake ECU 41 prohibits generation of the regenerative braking force by the motor generator 14 because there is a high possibility that the power-off operation (specific operation) completes.

Incidentally, when the brake ECU 41 determines whether the pressing operation of the operation button of the main switch 21 is the pressing operation regarding the power-on operation or the pressing operation regarding the power-off operation, the brake ECU 41 uses the ready-on history information in the above-described first alternative embodiment. In this case, some hybrid vehicles may be not configured to store the ready-on history information or the function of storing the ready-on history information may be impaired. Therefore, the second alternative embodiment in which it is determined whether the pressing operation of the operation button of the main switch 21 is the pressing operation regarding the power-on operation or the pressing operation regarding the power-off operation without using the ready-on history information. In the description of this second alternative embodiment as well, like reference numerals denote the same portions as those of the above-described embodiment and those of the above-described first alternative embodiment, and the detailed description is omitted.

Figure 7:
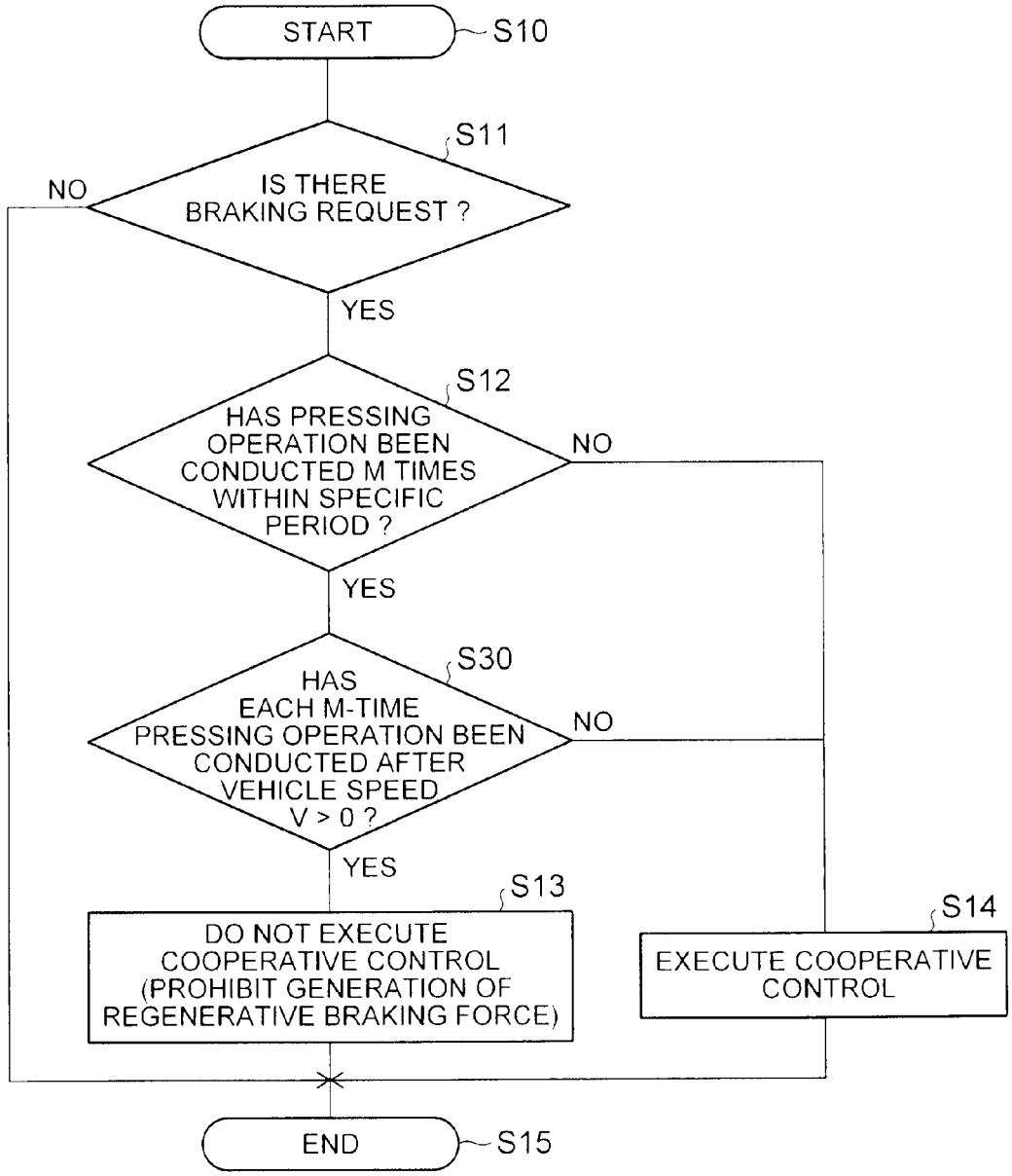
FIG. 7 is a flowchart of a control program that is executed by the control device (brake ECU) shown in FIG. 1 according to a second alternative embodiment to the embodiment of the invention.

In this second alternative embodiment, the brake ECU 41 repeatedly executes the control program shown in FIG. 7 each time a predetermined short time elapses. As shown in FIG. 7, the control program according to the second alternative embodiment differs from the control program according to the above-described first alternative embodiment, shown in FIG. 6, only in that step S20 is changed to step S30.

That is, in step S30, as in the case of step S20 of the control program described in the first alternative embodiment, the brake ECU 41 determines whether the M-time pressing operations determined in step S12 each are the pressing operation after the power-on operation is conducted, in other words, the pressing operation regarding the power-on operation is included in the M-time pressing operations conducted within the specific period. More specifically, as described in the first alternative embodiment, the pressing operation regarding the power-on operation is an operation conducted in order for the driver (occupant) to start causing the hybrid vehicle 10 to travel by setting the hybrid vehicle 10 in the reads-on state. Conversely, in the hybrid vehicle 10 that has been already traveling, in other words, the hybrid vehicle that is traveling at a vehicle speed higher than zero, the driver's (occupant's) power-on operation has been conducted, that is, the operation button of the main switch 21 has been pressed by the driver (occupant).

On the basis of this fact, in the second alternative embodiment, the brake ECU 41 continuously acquires the vehicle speed V of the hybrid vehicle 10 from the vehicle speed sensor 46, and stores vehicle speed history information indicating timing (history) at which the vehicle speed V becomes higher than zero in a predetermined storage position of the RAM. Thus, in the second alternative embodiment, the brake ECU 41 uses the vehicle speed history information and the operation information that are respectively stored in the predetermined storage positions of the RAM, and determines whether the M-time pressing operations conducted within the specific period and determined in step S12 each are conducted after the driver's (occupant's) pressing operation regarding the power-on operation. In other words, the brake ECU 41 uses the vehicle speed history information and the operation information, and determines whether the pressing operation regarding the power-on operation is included (counted) in the M-time pressing operations conducted within the specific period and determined in step S12.

Specifically, when the M-time pressing operations conducted within the specific period and determined in step S12 each are conducted after the timing at which the vehicle speed V becomes higher than zero, that is, after the power-on operation, the brake ECU 41 determines in step S30 that the power-on operation has been conducted before the specific period and the pressing operation regarding the power-on operation is not included in the M-time pressing operations and makes affirmative determination, after which the brake ECU 41 proceeds to step S13. In step S13, as in the case of the above-described embodiment and first alternative embodiment, the brake ECU 41 prohibits generation of the regenerative braking force by the motor generator 14 and, on the other hand, generates the friction braking force equal to the required braking force by the friction brake device 30. That is, the brake ECU 41 does not execute cooperative control in step S13 because the brake ECU 41 determines in step S30 that the M-time pressing operations conducted within the specific period each are the occupant's pressing operation regarding the power-off operation.

On the other hand, the brake ECU 41 makes negative determination in step S30 and proceeds to step S14 when the pressing operation regarding the power-on operation is included in the M-time pressing operations conducted within the specific period and determined in step S12. In step S14, as in the case of the above-described embodiment, the brake ECU 41 generates the required braking force by adjusting the regenerative braking force that is generated by the motor generator 14 and the friction braking force that is generated by the friction brake device 30. That is, the brake ECU 41 executes cooperative control in step S14 because the brake ECU 41 determines in step S30 that the occupant's pressing operation regarding the power-on operation is included in the M-time pressing operations conducted within the specific period and there is a low possibility that the power-off operation (specific operation) completes.

As can be understood from the above description, according to the above-described second alternative embodiment, as in the case of the first alternative embodiment, it is possible to increase an opportunity to achieve the required braking force by the use of both the regenerative braking force and the friction braking force, so it is possible to actively recover regenerative electric power resulting from generation of the regenerative braking force. Thus, it is possible to suppress deterioration of the fuel economy of the vehicle by consuming the recovered regenerative electric power. In addition, in this second alternative embodiment, the brake ECU 41 is able to appropriately detect the pressing operation regarding the power-off operation (specific operation), intended by the occupant, by determining whether the vehicle speed V is higher than zero even in, for example, a vehicle not configured to store the ready-on history information or a vehicle of which the function of storing the ready-on history information is impaired because of a failure, or the like.

Other Alternative Embodiments

In the above-described embodiment and the above-described first and second alternative embodiments, the brake ECU 41 determines in step S12 in each control program whether the operation button of the main switch 21 has been pressed M times within the specific period. Thus, the brake ECU 41 is able to determine that there is a high possibility that the pressing operation is conducted N times during braking of the hybrid vehicle 10 and the power-off operation (specific operation) completes. The brake ECU 41 is able to determine that there is a high possibility that the power supply circuit 20 is shut down by the hybrid ECU 47 and the operation of the motor generator 14 is stopped as a result of completion of the power-off operation (specific operation). Thus, in the above-described embodiment and the above-described first and second alternative embodiments, the brake ECU 41 prohibits generation of the regenerative braking force by the motor generator 14 in step S13 when the M-time pressing operations have been conducted in step S12.

Incidentally, even when the operation button of the main switch 21 has been pressed M times within the specific period, but when the operation button is not pressed by the occupant thereafter, the power-off operation (specific operation) does not complete. Thus, when the power-off operation (specific operation) does not complete, the hybrid ECU 47 does not shut down the power supply circuit 20, with the result that the hybrid ECU 47 does not stop the operations of the motor generators 13, 14. That is, when the power-off operation (specific operation) does not complete, the regenerative braking force is allowed to be continuously generated by the motor generator 14, so the brake ECU 41 preferably generates the required braking force by adjusting both the regenerative braking force and the friction braking force through cooperative control.

Therefore, when the brake ECU 41, for example, determines (detects) in the determination process in step S12 that the operation button of the main switch 21 has been pressed M times within the specific period, the brake ECU 41 prohibits generation of the regenerative braking force by the motor generator 14 until a lapse of a predetermined time from the timing at which the M-th pressing operation has been detected in step S13, more specifically, the operation information corresponding to the M-th pressing operation has been stored (hereinafter, referred to as operation detection timing). The predetermined time should be set so as to be longer than a time from the operation detection timing to the predetermined timing T1 at which the hybrid ECU 47 detects the power-off operation and shuts down the power supply circuit 20 on the assumption that the power-off operation (specific operation) completes within the threshold time.

In this way, by prohibiting generation of the regenerative braking force by the motor generator 14 until a lapse of the predetermined time from the operation detection timing, when the power-off operation (specific operation) completes, the regenerative braking force is, for example, kept not being generated because of passing by the predetermined timing T1, so the brake ECU 41 is able to generate the required braking force by continuously generating the friction braking force by the friction brake device 30. Thus, even after a lapse of the predetermined time, the braking force does not fluctuate or the deceleration does not fluctuate, so the occupant does not experience a feeling of strangeness.

On the other hand, when the power-off operation (specific operation) does not complete, the brake ECU 41 generates the required braking force by adjusting both the regenerative braking force and the friction braking force in accordance with cooperative control at the timing at which the predetermined time has elapsed from the operation detection timing. With this configuration as well, even after a lapse of the predetermined time, fluctuations in the braking force are suppressed and the deceleration does not fluctuate, so the occupant does not experience a feeling of strangeness. Because it is possible to appropriately generate the regenerative braking force by the motor generator 14, it is also possible to suppress deterioration of fuel economy by consuming recovered regenerative electric power.

The invention is not limited to the above-described embodiment and the above-described alternative embodiments. The invention may be implemented in various forms without departing from the object of the invention.

For example, in the above-described first alternative embodiment, the brake ECU 41 uses the ready-on history information and determines whether the M-time pressing operations conducted within the specific period each are conducted after the power-on operation, that is, whether the pressing operation regarding the power-on operation is included in the M-time pressing operations conducted within the specific period. In the above-described second alternative embodiment, the brake ECU 41 uses the vehicle speed history information and determines whether the M-time pressing operations conducted within the specific period each are conducted after the vehicle speed V becomes higher than zero (after the power-on operation), that is, whether the pressing operation regarding the power-on operation is included in the M-time pressing operations conducted within the specific period. In the above-described first alternative embodiment and second alternative embodiment, when the M-time pressing operations conducted within the specific period each are conducted after the power-on operation, the brake ECU 41 prohibits generation of the regenerative braking force by the motor generator 14, in other words, does not execute cooperative control.

In these cases, the brake ECU 41 may, for example, use both the ready-on history information and the vehicle speed history information and determine whether at least one of the condition that the M-time pressing operations conducted within the specific period each are conducted after the power-on operation and the condition that the M-time pressing operations conducted within the specific period each are conducted after the vehicle speed V becomes higher than zero is satisfied. Thus, when the M-time pressing operations conducted within the specific period each are conducted after the power-on operation and/or when the M-time pressing operations conducted within the specific period each are conducted after the vehicle speed V becomes higher than zero, the brake ECU 41 is able to prohibit generation of the regenerative braking force by the motor generator 14. Thus, in this case as well, similar advantageous effects to those of the above-described embodiment and alternative embodiments are obtained.

In the above-described second alternative embodiment, the brake ECU 41 continuously acquires the vehicle speed V from the vehicle speed sensor 46 and stores the timing at which the vehicle speed V becomes higher than zero as the vehicle speed history information. In this case, instead of or in addition to continuously acquiring the vehicle speed V from the vehicle speed sensor 46, the brake ECU 41 may continuously acquire another physical quantity that allows to specify the timing at which the vehicle speed V becomes higher than zero, for example, such as the value of current at which the motor generator 14 is energized and the longitudinal acceleration of the hybrid vehicle 10. In this case, the brake ECU 41 specifies the timing at which the vehicle speed V becomes higher than zero on the basis of the acquired physical quantity, and stores the vehicle speed history information. Thus, similar advantageous effects to those of the above-described second alternative embodiment are obtained.

In the above-described embodiment and alternative embodiments, the brake ECU 41 executes the control program. In these cases, the hybrid ECU 47 that constitutes the control unit may be configured to execute the control program. Specifically, when the hybrid ECU 47, for example, stores the ready-on history information or the vehicle speed history information and prohibits generation of the regenerative braking force by the motor generator 14, the hybrid ECU 47 controls the operation of the friction brake device 30 in cooperation with the brake ECU 41. Thus, similar advantageous effects to those of the above-described embodiment, and the like, are obtained. Alternatively, a new electronic control unit (ECU) that integrates the function of the brake ECU 41 with the function of the hybrid ECU 47 may be employed.

In the above-described embodiment, the above-described alternative embodiments, the friction brake device 30 that uses hydraulic pressure and that supplies the hydraulic pressure of working fluid to the wheel cylinders 343 is employed as the friction braking device. In this case, a disc brake unit (brake device) may also be employed as the friction braking device. For example, a disc brake device (brake device) may be employed such that brake pads (friction members) are pressed against a disc rotor (rotating member) by an electric motor.

What is claimed is:

1. A vehicle comprising:
   a friction braking device configured to generate a friction braking force;
   a generator motor configured to generate a regenerative braking force; and
   an electronic control unit configured to:
   adjust the friction braking force and adjust the regenerative braking force by controlling energization of the generator motor such that a required braking force that is required by the vehicle is generated,
   interrupt energization of the generator motor after a specific operation, which is a combination of a plurality of operations conducted by an occupant, has completed within a threshold time, and
   control the generator motor so as to prohibit generation of the regenerative braking force by the generator motor when at least one of the plurality of operations combined as the specific operation has been detected within a specific period prior to braking start timing, which is a timing in which the required braking force is started.

2. The vehicle according to claim 1, wherein
   the electronic control unit is configured to detect the at least one of the plurality of operations combined as the specific operation after a travel starting operation to start causing the vehicle to travel.

3. The vehicle according to claim 1, wherein
   the electronic control unit is configured to detect the at least one of the plurality of operations combined as the specific operation after a vehicle speed of the vehicle becomes higher than zero.

4. The vehicle according to claim 1, wherein
   the electronic control unit is configured to prohibit generation of the regenerative braking force by the generator motor until a lapse of a predetermined time from operation detection timing at which the at least one of the plurality of operations combined as the specific operation has been detected.

5. The vehicle according to claim 1, wherein
   the specific period is a period back from the braking start timing by a time shorter than or equal to the threshold time.

6. The vehicle according to claim 1, wherein
   the specific operation is a combination of multiple pressing operations of a switch that is used at the time of changing from an energized state where an electrical device mounted on the vehicle is energized to a non-energized state where energization of the electrical device is interrupted, and
   the electronic control unit is configured to interrupt energization of the generator motor by interrupting at least an energization path to the generator motor at the predetermined timing.

* * * * *